US009635000B1

(12) United States Patent
Muftic

(10) Patent No.: US 9,635,000 B1
(45) Date of Patent: Apr. 25, 2017

(54) BLOCKCHAIN IDENTITY MANAGEMENT SYSTEM BASED ON PUBLIC IDENTITIES LEDGER

(71) Applicant: Sead Muftic, Rockville, MD (US)

(72) Inventor: Sead Muftic, Rockville, MD (US)

( * ) Notice: Subject to any disclaimer, the term of this patent is extended or adjusted under 35 U.S.C. 154(b) by 0 days.

(21) Appl. No.: 15/163,922

(22) Filed: May 25, 2016

(51) Int. Cl.
*H04L 29/06* (2006.01)
*H04L 29/08* (2006.01)
(Continued)

(52) U.S. Cl.
CPC ............ *H04L 63/0435* (2013.01); *H04L 9/14* (2013.01); *H04L 9/30* (2013.01); *H04L 9/3247* (2013.01);
(Continued)

(58) Field of Classification Search
CPC ... H04L 9/14; H04L 63/20; H04L 9/32; H04L 9/3247
See application file for complete search history.

(56) References Cited

U.S. PATENT DOCUMENTS

| | | | |
|---|---|---|---|
| 9,298,806 | B1 | 3/2016 | Vessenes et al. |
| 9,344,282 | B2 | 5/2016 | Yoo et al. |

(Continued)

OTHER PUBLICATIONS

Joon Wong, "DocuSign Founder Sees Blockchain Tech Potential in Identity Management", Retrieved from www.coindesk.com, Nov. 11, 2014.*

(Continued)

*Primary Examiner* — Chau Le
(74) *Attorney, Agent, or Firm* — Morris, Manning & Martin LLP; Daniel E. Sineway, Esq.

(57) ABSTRACT

The invention describes an identity management system (IDMS) based on the concept of peer-to-peer protocols and the public identities ledger. The system manages digital identities, which are digital objects that contain attributes used for the identification of persons and other entities in an IT system and for making identity claims. The identity objects are encoded and cryptographically encapsulated. Identity management protocols include the creation of identities, the validation of their binding to real-world entities, and their secure and reliable storage, protection, distribution, verification, updates, and use. The identities are included in a specially constructed global, distributed, append-only public identities ledger. They are forward- and backward-linked using the mechanism of digital signatures. The linking of objects and their chaining in the ledger is based on and reflect their mutual validation relationships. The identities of individual members are organized in the form of linked structures called the personal identities chains. Identities of groups of users that validated identities of other users in a group are organized in community identities chains. The ledger and its chains support accurate and reliable validation of identities by other members of the system and by application services providers without the assistance of third parties. The ledger designed in this invention may be either permissioned or unpermissioned. Permissioned ledgers have special entities, called BIX Security Policy Providers, which validate the binding of digital identities to real-world entities based on the rules of a given security policy. In unpermissioned ledgers, community members mutually validate their identities. The identity management system provides security, privacy, and anonymity for digital identities and satisfies the requirements for decentralized, anonymous identities management systems.

24 Claims, 8 Drawing Sheets

Example of BIX Identity Public Attributes (enveloped)

(51) Int. Cl.
*H04L 9/32* (2006.01)
*H04L 9/30* (2006.01)
*H04L 9/14* (2006.01)

(52) U.S. Cl.
CPC .............. *H04L 63/06* (2013.01); *H04L 63/20* (2013.01); *H04L 67/104* (2013.01)

(56) References Cited

U.S. PATENT DOCUMENTS

| | | | |
|---|---|---|---|
| 9,344,425 B2 | 5/2016 | Belton et al. | |
| 9,344,832 B2 | 5/2016 | Schell et al. | |
| 2008/0244685 A1* | 10/2008 | Andersson | G06F 21/53 726/1 |
| 2014/0344015 A1* | 11/2014 | Puertolas-Montaes | G06Q 20/10 705/7.29 |
| 2015/0026072 A1* | 1/2015 | Zhou | H04M 1/72522 705/71 |
| 2015/0164192 A1* | 6/2015 | Gross | A45C 1/12 232/4 R |
| 2015/0324787 A1* | 11/2015 | Schaffner | G06Q 20/3674 705/67 |
| 2015/0356523 A1* | 12/2015 | Madden | G06Q 20/065 705/76 |
| 2016/0027229 A1* | 1/2016 | Spanos | G07C 13/00 705/51 |
| 2016/0085955 A1* | 3/2016 | Lerner | G06F 21/31 726/20 |
| 2016/0217532 A1* | 7/2016 | Slavin | G06Q 40/08 |
| 2016/0283941 A1* | 9/2016 | Andrade | H04L 9/32 |
| 2016/0330027 A1* | 11/2016 | Ebrahimi | H04L 9/3066 |
| 2017/0011460 A1* | 1/2017 | Molinari | G06Q 40/04 |

OTHER PUBLICATIONS

Sead Muftic, Nazri Abdullah, and Ioannis Kounelis, "Business Information Exchange System with Security, Privacy, and Anonymity", Journal of Electrical and Computer Engineering, Sep. 30, 2015.*
Ali, M., et al., "Blockstack: Design and Impementation of a Global Naming System with Blockchains", 2016 USENIX Annual Technical Conference (USENIX ATC'16).
BITCOIN (web site) https://en.bitcoin.it/wiki, 2010.
BitID (web site) "BitID Open Protocol", http://bitid.bitcoin.blue/, 2015.
Brickell, E., et al., "Direct Anonymous Attestation", CCS '04, ACM 2004 pp. 132-145.
Chaum, D., "Security without identification: transactions system to make big brother obsolete", CACM, 1985.
Fromknecht, C., et al., "A Decentralized Public Key Infrastructure with Identy Retention", MIT, Class 6,857 Project, Nov. 11, 2014.
Fromknecht, C., et al., "CertCoin: A Namecoin based decentralized Authentication System", MIT, Class 6.857 Project, May 14, 2014.
Garman, Ch., et al., "Decentralized Anonymous Credentials", IACR Cryptology ePrint Archive, 2013:622, 2013.
Reid, F. et al., "An Analysis of Anonymity in the Bitcoin System" in Security and Privacy in Social Networks, ed. Yaniv Altshuler et al. (New York: Springer, 2013), http://arxiv.org/pdf/1107.4524v2.pdf.
Ron, D. et al., "Quantitative Analysis of the Full Bitcoin Transaction Graph," IACR Cryptology ePrint Archive 584 (2012), http://eprint.iarc.org/2012/584.pdf.
RFC 6962, Laurie, B., et al., "Certificate Transparency", RFC 6952, Jun. 2013.

* cited by examiner

```
BIX Identity ::= SIGNED SEQUENCE (
    Header ::= SEQUENCE {                          ←——— 101
        identificationNumber   INTEGER
        version                INTEGER
        creationDateTime       CHOICE {
            UTCTime,
            generalizedTime
        }
        assuranceLevel    INTEGER
    }
    SearchAttributes ::= SEQUENCE {                ←——— 102
        encryptedCommonName     OCTET STRING
        encryptedEmail          OCTET STRING
        encryptedMobileNumber   OCTET STRING
    }
    PublicAttributes ::= SET {                     ←——— 103
        distinguishedName    DistinguishedName
        -- selection of non X.500 attributes
    }
    InitialValidator ::= SEQUENCE {                ←——— 104
        validatorIDNumber        INTEGER
        signatureAlg             AlgorithmIdentifier,
        validatorPublicKey       OCTET STRING
        clearAttributesSignature OCTET STRING
    }
    InitialValidatorSignature    OCTET STRING      ←——— 105
}
```

Figure 1: BIX Identity Object

Figure 2: BIX Identities Ledger (Initial version with the Security Policy Authority)
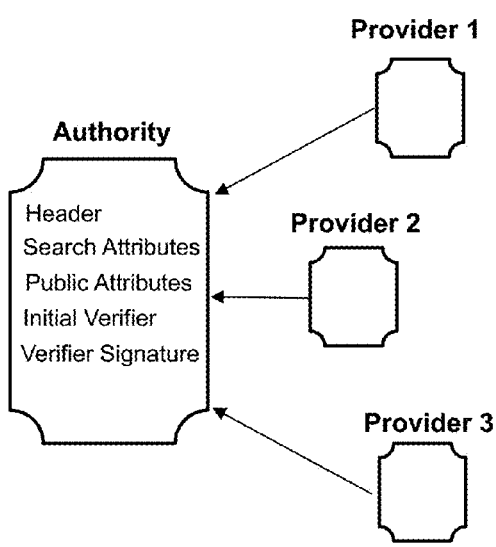
Figure 3: BIX Identities Ledger (with Identities of Security Policy Providers)

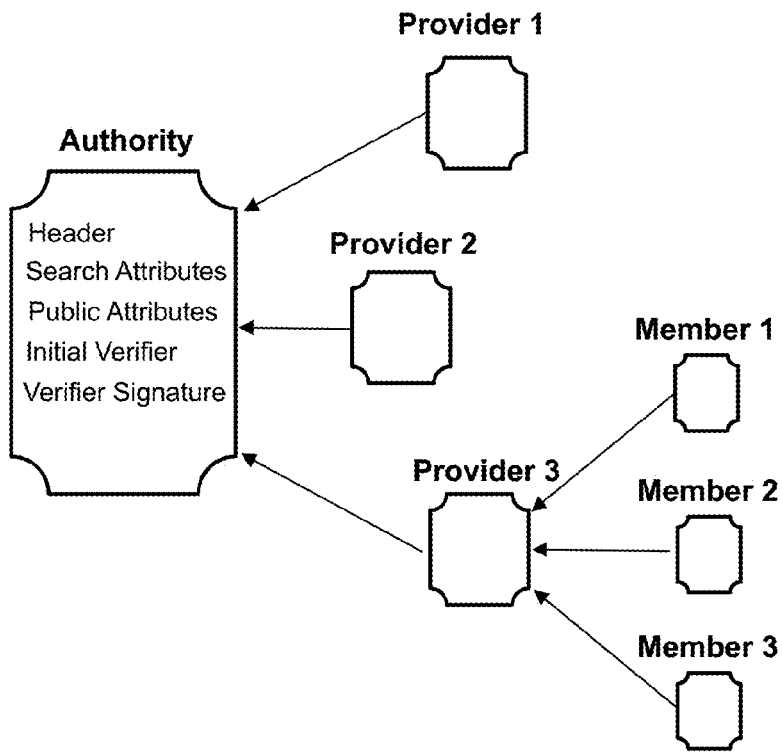
Figure 4: BIX Identities Ledger – Permissioned (with Identities of Members before Updates)
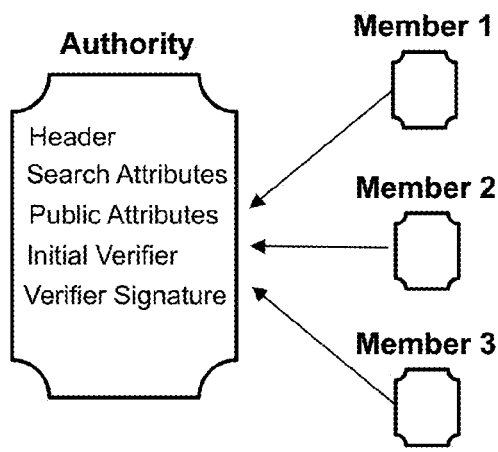
Figure 5: BIX Identities Ledger – Unpermissioned (with Identities of Members before Updates)

```
BIX Identity Validator ::= SEQUENCE {
    Header ::= SEQUENCE {                           ←――― 601
        identificationNumber   INTEGER
        validationDateTime     CHOICE {
            UTCTime,
            generalizedTime
        }
    }
    BlockchainValidator ::= SEQUENCE {              ←――― 602
        validatorIDNumber      INTEGER
        signatureAlg           AlgorithmIdentifier,
        validatorPublicKey     OCTET STRING
    }
    BlockchainValidatorSignature  OCTET STRING      ←――― 603
}
```

Figure 6: BIX Identity Validator Object

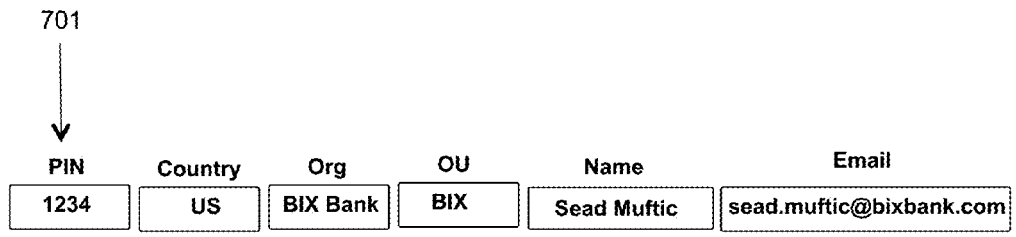
Figure 7: Example of BIX Identity Public Attributes (in clear)
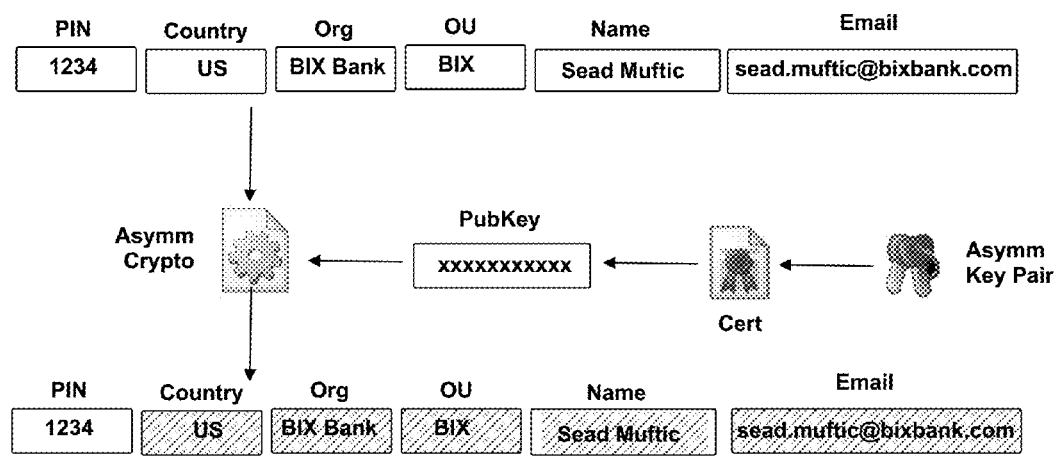
Figure 8: Example of BIX Identity Public Attributes (enveloped)

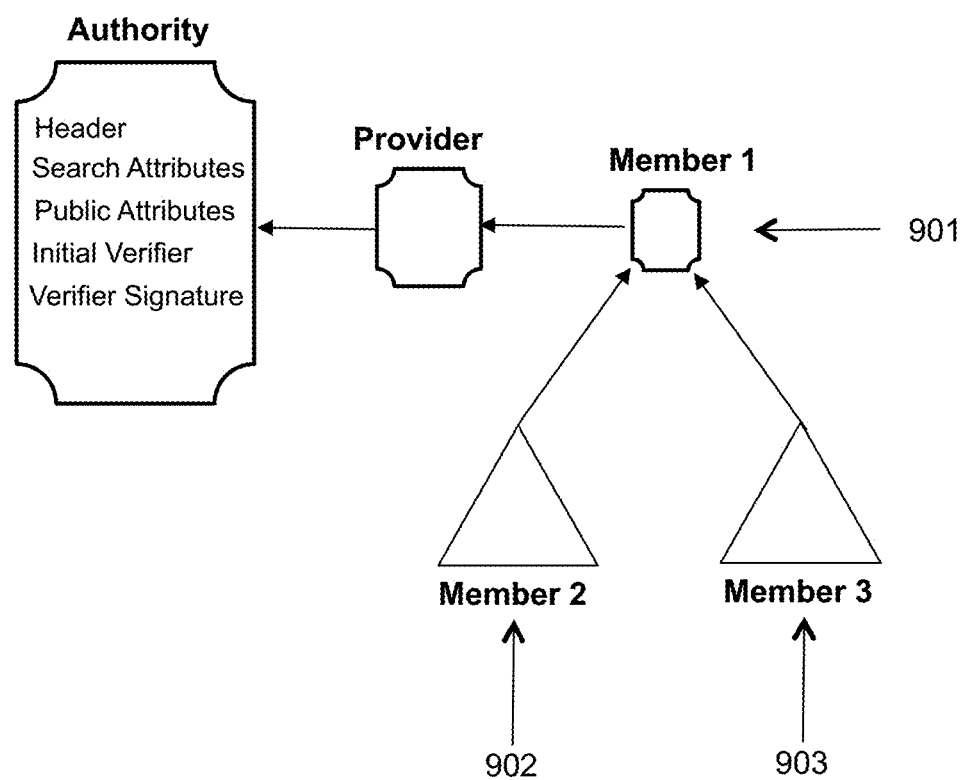
Figure 9: BIX Identities Ledger (with Validators)

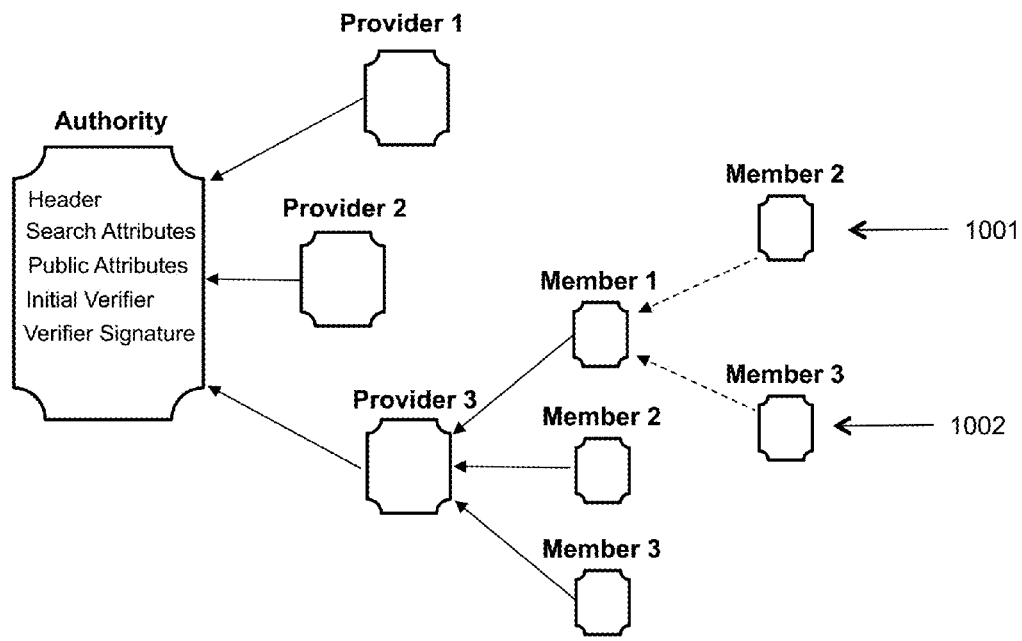
Figure 10: BIX Personal Identities Chain
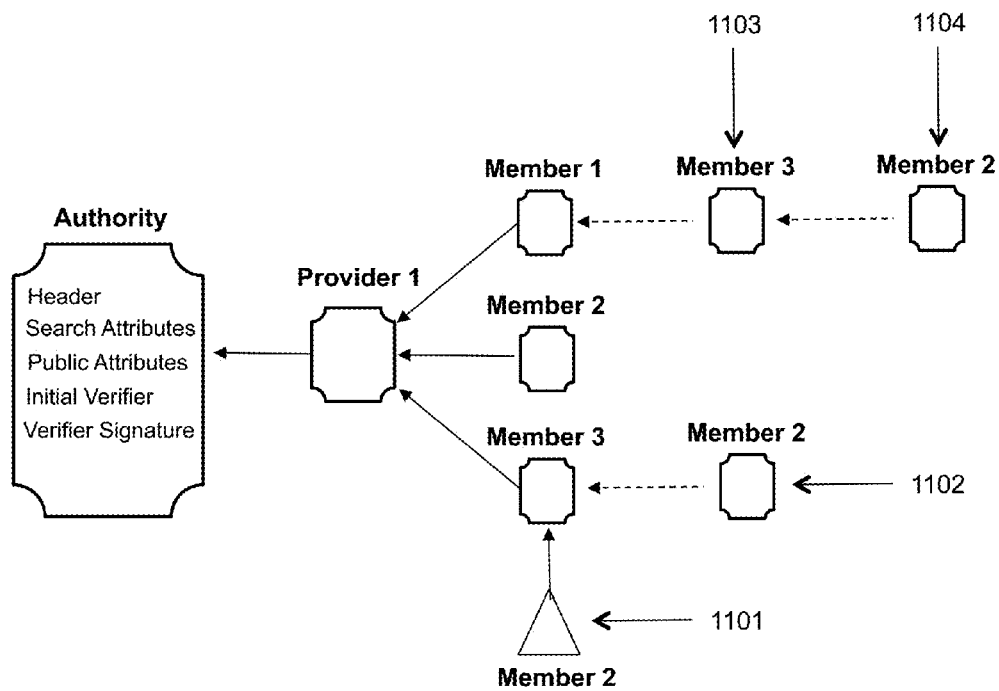
Figure 11: BIX Community Identities Chain

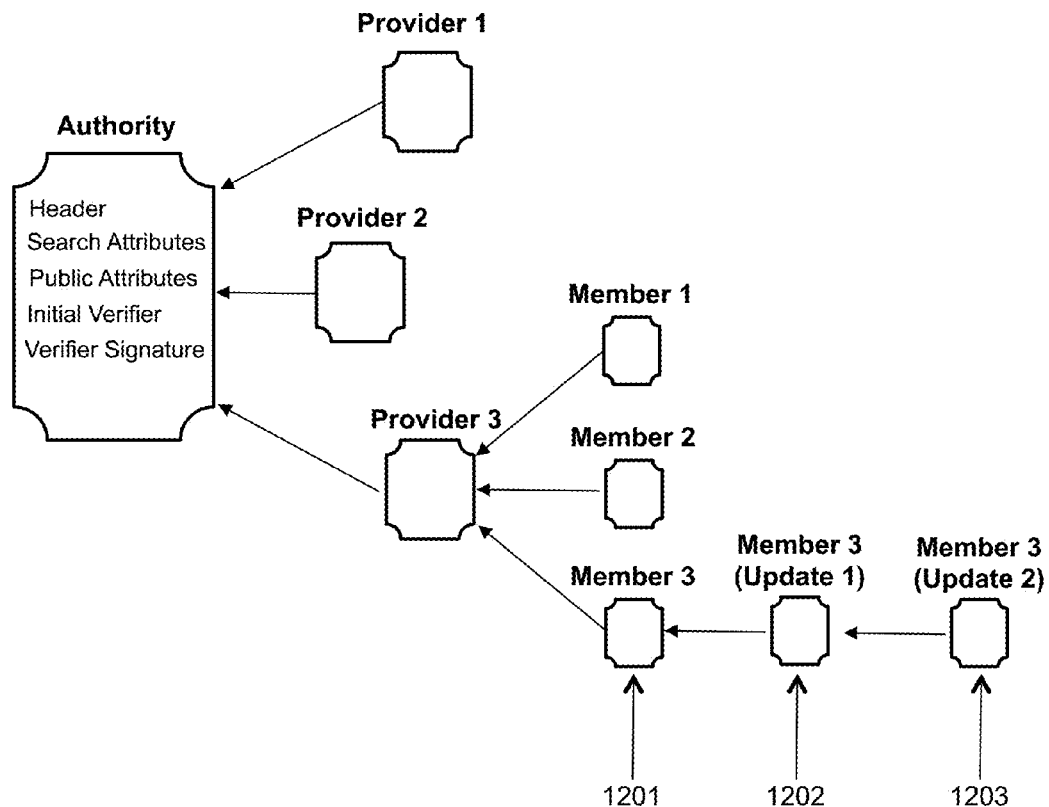
Figure 12: BIX Identities Ledger (with Identities of Members with Updates)

BLOCKCHAIN IDENTITY MANAGEMENT SYSTEM BASED ON PUBLIC IDENTITIES LEDGER

REFERENCES CITED

US Patents

| | |
|---|---|
| 9,344,832 | Shell, et al. |
| 9,344,282 | Yoo, et al. |
| 9,344,425 | Belton, et al. |
| US 20080244685 | Andersson, et al. |
| US 20150164192 A1 | Gross |
| US 20150324787 A1 | Schaffner, D. |
| U.S. 9,298,806 B1 | Vessenes, P.J. et all. |

Other Publications

ALI, M., et al., *"Blockstack: Design and Implementation of a Global Naming System with Blockchains"*, 2016 USENIX Annual Technical Conference (USENIX ATC'16)
Bitcoin (web site) https://en.bitcoin.it/wiki, 2010
BitID (web site) *"BitID Open Protocol"*, http://bitid.bitcoin.blue/, 2015
BRICKELL, E., et al., *"Direct Anonymous Attestation"*, CCS '04, ACM 2004 pp. 132-145 Certificate Transparency (web site) https://www.certificate-transparency.org/
CHAUM, D., *"Security without identification: transactions system to make big brother obsolete"*, CACM, 1985
Dot-bit (web site) http://dot-bit.org/
FROMKNECHT, C., et al., *"CertCoin: A Namecoin based decentralized Authentication System"*, MIT, Class 6,857 Project, May 14, 2014
FROMKNECHT, C., et al., *"A Decentralized Public Key Infrastructure with Identity Retention"*, MIT, Class 6,857 Project, Nov. 11, 2014
GARMAN, Ch., et al., *"Decentralized Anonymous Credentials"*, IACR Cryptology ePrint Archive, 2013:622, 2013
MAYMONIKER, P., at al., *"Kademlia: A peer-to-peer information system based on the XOR metric"*, http://kademlia.scs.cs.nyu.edu
MELARA, M., et al., "CONIKS: Bringing Key Transparency to End Users", 247h USENIX Security Symposium
Namecoin (web site) https://www.namecoin.org/
REID, F. et al., *"An Analysis of Anonymity in the Bitcoin System"* in Security and Privacy in Social Networks, ed. Yaniv Altshuler et al. (New York: Springer, 2013), http://arxiv.org/pdf/1107.4524v2.pdf
RON, D. et al., *"Quantitative Analysis of the Full Bitcoin Transaction Graph,"* IACR Cryptology ePrint Archive 584 (2012), http://eprint.iacr.org/2012/584.pdf
RFC 5280, Cooper, D. et al, *"Internet X.509 Public Key Infrastructure Certificate and Certificate Revocation List (CRL) Profile"*, IETF RFC 5280
RFC 6962, Laurie, B., et al., *"Certificate Transparency"*, RFC 6962, June 2013
ZYSKIND, G., *"Decentralizing Privacy: Using Blockchain to Protect Personal Data"*, MIT Media Lab

TECHNICAL FIELD OF THE INVENTION

This invention is related to identity management systems (IDMSs) in IT environments and, more specifically, to identity management systems that support user security, privacy, and anonymity for their identity and transaction data. The focus of the invention is on using cryptographic mechanisms, peer-to-peer protocols, and global, distributed, append-only public identities ledgers to protect identities, to perform all identity management functions, and to support identity claims.

BACKGROUND OF THE INVENTION

An identity management system is a system that manages digital identities, which are a collection of attributes and their values used to identify the entities of an IT system and make identity claims. Identity management includes entity creation (registration) and validation (binding of identity attributes to real-world entities), as well as storage, maintenance, updates, distribution, verification, use, and protection of identities. Identity attributes and their values, the so-called namespace, include named objects that represent real-world entities, such as countries, organizations, computers, applications, persons, and devices.

The attributes comprising digital identities are used by humans, computers, and digital devices to identify, recognize, and interact with other entities involved in the operation of an IT system. Use of identities allow a person or a computer to recognize entities involved in a session or transaction, i.e. associate digital identity with the real-world person, computer, or device and, based on that, to determine the role, profile, authorization, and scope of actions that an entity is authorized to perform. Because of all the services that an IDMS provides, the role of such a system in automated IT environments is extremely important. Specifically, (a) IDMS functions must be always performed correctly, (b) IDMS data management must be reliable and correct, and (c) IDMS resources (software and data) must be strongly protected against illegal or accidental modifications, deletions; and insertions.

At the time of this invention, most IDMS implementations are in the form of large, centralized database repositories located on large network or cloud servers. Although such solutions correctly perform their core functions, centralized database servers have, in principle, many serious problems. First, they represent single point of failure. Next, in addition to basic functionality, it is also important to maintain and guarantee the correctness, integrity, and continuous availability of data. In distributed, large-scale environments, the components and protocols for using them—federation—are very complicated. For an IDMS, its protection, authenticated access, secure administration, and authorized use are important considerations. Because identification data must be protected when transferred outside of the security perimeter, a centralized IDMS is very expensive to establish, maintain, operate, and protect. Finally, all participants in an IT system must place a high level of trust in the correct operation and accuracy of the data stored in, and distributed by, an IDMS.

In addition to problems due to the large size and centralized nature of such repositories, trust is required for IDMS functions that are provided by third-party solutions. To provide that trust, IDMS providers must guarantee the following features: (a) the protection and control of external access to IDMS repositories, (b) the internal protection of data stored in these repositories, (c) the elimination of impersonation by authorized administrators, (d) the security of all protocols and data, (e) the recovery of all lost, stolen, or destroyed data.

In addition to identifying system entities, the data stored in an IDMS are often also used for other security services, such as the authentication, authorization, management of secret keys, and others. At the time of this invention, the security services always required users' sensitive and secret data to be stored in IDMS repositories. This approach requires not only the strong protection of these security credentials, but also their correct use. All these aspects represent another group of important problems and weaknesses of centralized repositories that store and handle secret and sensitive user data.

If all these complex security aspects and arrangements are successfully resolved, then the attributes and functions of an IDMS may be used with full confidence for security services. However, in addition to security, at the time of this invention, two significant trends of increasing importance were user privacy and anonymity of their identity and transaction data. An IDMS that stores users' explicit identifying attributes and their sensitive security credentials cannot provide privacy and anonymity of users and their transactions. In addition, at the time of this invention, almost all IT application service providers collect personal and transaction data and use and share this data in unauthorized ways, without user consent, thus further violating user privacy and anonymity.

Based on all of these problems, it is obvious that it is important for identity management solutions to not use large directories or database repositories, to not require trust, to protect the data stored in repositories, and to allow users to prevent and control the use and sharing of their personal data.

At the time of this invention, there was an emerging concept with characteristics and features that seemed like a promising approach and technology to solve some, if not all, problems mentioned above. The concept has emerged from the Bitcoin peer-to-peer payment system and is called the distributed public ledger. In general, the ledger represents a public archive of the data and transactions that are performed in some data processing system. The concept is promising because (a) the data stored in a ledger are all public and therefore not vulnerable to theft, (b) the data are integrity-protected and therefore not vulnerable to illegal or accidental modifications, (c) the data are time-stamped, so their date/time of origin could be validated, and (d) the data are sequenced in a functional, cryptographic time "chain", so illegal insertions of false data is impossible. These core features of public ledgers are very attractive solutions for the design, implementation, and operation of large-scale identity management systems that do not contain private and personal data and operate without the assistance of any third party and without the need to trust any component of the overall system.

The core idea and the main functionality of the public ledger introduced in the Bitcoin system is to enable a recipient of a peer-to-peer payment transaction to validate the correctness of the transaction without relying on a third party. For payments, validation includes the validation that a payer has sufficient amount of Bitcoins to make the transaction and proof that "double-spending" was not performed. For that, Bitcoin uses the approach to reconstruct the balance of the sender's wallet by the recipient. The recipient performs that by tracing all sender's transactions, from the first "coinbase" transaction up to the last transaction received by the sender. The construction of the blockchain, which contains cryptographically signed and mutually linked blocks of transactions, effectively prevents the illegal manipulation of transaction history and, in that way, guarantees to all participants the correctness of individual transactions.

The idea of using the original Bitcoin public ledger and blockchain, which are used for Bitcoin payment transactions, as the supporting technology and concept for some other type of applications generated many interesting ideas and initiatives. But, although attractive and interesting, careful analysis of the proposed solutions shows that they are all deficient, contradictory, infeasible, and inadequate; in essence, they do not offer the full functionality of an IDMS. The main reason for the difficulties in using the Bitcoin blockchain is that as a linked list of blocks of payment transactions, it is not suitable for use with identities. The identities of individual entities are not mutually functionally related, so they do not need to be linked to each other or packaged in Bitcoin blocks. They do not functionally depend on each other and do not have a dependency sequence; therefore, they do not need to be chained in the Bitcoin ledger. Another serious limitation is that when Bitcoin addresses, which are public cryptographic keys, are used as the identities of user accounts, they provide only and limited user anonymity and not user identification, authentication, or authorization. The anonymity of user identities is suitable for peer-to-peer payment transactions using Bitcoin, but not for many other types of applications and transactions, even with other types of virtual currencies. Bitcoin concept is also vulnerable to the theft of private keys, resulting in direct access to the users' Bitcoin wallets.

Furthermore, at the time of this invention, there are many operational issues when using the Bitcoin blockchain and its ledger for applications and transactions other than Bitcoin payments. The size of the blocks is too small, the throughput of the Bitcoin validation protocol is very low, the validation of blocks has long delays, the Bitcoin network is vulnerable to denial-of-service attacks, the protocol is vulnerable to timing attacks, and dishonest mining procedures and arrangements. Therefore, all the ideas that suggested using standard concept of the Bitcoin blockchain and public ledger to manage digital identities do not represent feasible and viable solutions. Furthermore, careful analysis of all existing solutions reveals that none perform IDMS protocols as pure peer-to-peer transactions; rather, each of them introduces some type of the third-party component that makes them, in essence, equivalent to large IDMS repositories.

One important problem with every IDMS, which solutions based on use of the Bitcoin blockchain and its public ledger did not solve, was binding of digital identities to the real-world entities that they identify. Some solutions that use the Bitcoin blockchain to store and distribute the hashes of user identities suggest using social websites as data sources for these identities. However, this method of validating identities, merely by the fact that they are included in a blockchain, is misleading because (a) the sources of these identities are unreliable and (b) their validation can be much better and more efficiently performed using original websites. The authors of these ideas incorrectly claim that by using Bitcoin blockchain, users would regain control of their personal information, which contradicts the nature of the blockchain as a public ledger where the stored identities may be accessed and used by anyone. In fact, the main weakness of this solution is that there is no personal protection of public data in a blockchain, which means that users still do not have control of the access and use of their data by other users and service providers.

One of the subtle problems of the simple approach of loading hashes of identities into a Bitcoin blockchain is the verification of the relationship of attribute values to real-world entities. Identities established without validation, using first-come, first-serve principle, are completely unreliable and therefore cannot be used for serious business applications. While Bitcoin payments are performed in a completely new system, one that is isolated from any other system and functionally independent of all other systems, identities and their data are not objects of that nature. Namely, any reliable and trusted IDMS must guarantee the correctness of its data and their reliable binding to real-world entities. In classical IDMS, that validation is performed by IDMS providers. Therefore, these properties can be achieved only by validating blockchain entries by trusted identity providers that are external to the blockchain IDMS. However, this approach is contrary to the very nature of the blockchain approach, as it depends on trusted third parties to validate identities.

Another important conceptual problem with solutions that rely on the Bitcoin concept, network, protocols, and messages is the fact that the Bitcoin system is not truly peer-to-peer system. It uses and depends on trusted third parties, which are network servers comprising the Bitcoin network. Not only must users trust these servers to perform efficiently and correctly their functions, what cannot be formally verified, but the network servers also control the overall system in terms of the difficulty of hashing, the timing of releasing of blocks, block sizes, and payout rewards. Another category of trusted third parties in the Bitcoin system is miners—persons who perform cryptographic operations on blocks of transactions to validate them. This clearly means that any IDMS that uses the services of the Bitcoin network is itself not reliable and depends on third-party components.

Another serious problem with the Bitcoin blockchain is the delay in validation of blocks and transactions. On average, it takes about 10 minutes; furthermore, transactions cannot be considered validated until they appear in the subsequent six/seven most recent blocks. This delay makes the use of such protocols completely unacceptable for many applications that need instantaneous validated transactions. A serious conceptual problem is that there may not be a hash for the block that corresponds to the given target. These reasons—slow progress, long reaction time, and the possibility that the progress of the blockchain may be blocked—also suggest the need for the new and innovative approach described in this invention.

Yet another important problem with all solutions that rely on the Bitcoin blockchain is that they do not provide the identification for real-world entities whose identities have been included in the blockchain when making identity claims. As mentioned earlier, identities must be used to recognize real-world entities. Inserting hashes and public keys into the Bitcoin blockchain merely proves the existence of the specific set of attributes and their values at the time when the hash is inserted and their binding to the corresponding public key. Thus, these attributes cannot be used to recognize a specific entity from the real-world, since it is impossible to reliably relate the attributes with the entity that these attributes describe and that owns the public key.

The final deficiency of solutions proposed at the time of this invention was that all of them, in addition to the Bitcoin network, also used a number of their own new servers. So, even if the Bitcoin network is only considered to be a distribution network, the proposed solutions do not perform pure peer-to-peer transactions. They introduce new servers as trusted third parties and new complex infrastructures, equivalent to the classical IDMS servers that the new solutions claim to improve. Some of these servers are used as intermediaries, some as external storage servers, and others for generating and handling protocol attributes.

In conclusion, the essence of the blockchain in the Bitcoin system is to make available and to guarantee the correctness of all transactions in the system and to provide the mechanisms to validate their correctness. Interpreting these two features formally and applying them to an IDMS leads to the conclusions that (a) the identities of individual entities can be included in the blockchain and thus be available to the entire community, and (b) identities and their blocks should be hashed and signed based on proof-of-work by miners, so that their content is guaranteed. However, such a formal approach has no significant advantages. First, the distribution of identities is not an essential problem for any IDMS. Second, integrity of attribute values can be guaranteed by using standard cryptographic algorithms. And third, miners cannot solve the key problem of any IDMS: binding of identity attributes to real-world persons. Therefore, an innovative solution must address and eliminate these issues and introduce additional features that offer clear benefits.

The system proposed in this invention performs its functions as truly peer-to-peer transactions without any third parties and without the requirement to place the trust in any component of the system. As such, the proposed system is an IDMS based on the concept of the public identities ledger. The resources of the system (identities) are strongly protected, maintained, and distributed only by consent of their owners. The system provides full security, privacy, and anonymity of user identities. Such an IDMS represents the backbone of an infrastructure supporting applications that require security, privacy, and anonymity for their users, transactions, and data.

SUMMARY OF THE INVENTION

The innovative system described in this invention is based on two underlying principles: (1) all operations of the IDMS are performed only as peer-to-peer operations between two members of the system, and (2) there are no third parties involved, and only the members of the system participate in its operations. In addition, by using a specially designed public ledger, containing identities as its elements, called the public identities ledger, the system provides all the features expected from a secure and reliable IDMS. First, although identities are publicly available in the ledger, privacy and anonymity are guaranteed by the special methods of selection and cryptographic protection of identity attributes. Binding identities with real-world entities is validated; therefore, the identities are reliable. Finally, the identities are distributed and used only with the consent and control of their owners.

The public identities ledger for management of identities designed in this invention is a subsystem of a larger system whose purpose is to store and distribute different types of transaction objects, attributes, credentials, and transactions. That system is based on the concept of a global, distributed, append-only public ledger. That system is called the Blockchain Information eXchange (BIX) system. Therefore, the IDMS described in this invention is referred to as the BIX Identities System.

An instance of a public identities ledger for the BIX Identities System is initiated by its BIX Security Policy Authority. This is the entity that created software for the system and enforces the policy by technology rules. That entity initiates an instance of the ledger by creating its own identity and inserts it in the public identities ledger, i.e., as the "head" identity. The attributes of that identity are shown in FIG. 1 and the identity is shown in FIG. 2. The attributes of this identity and its binding to a real-world entity cannot be validated by any other entity, because at the moment of its initiation, there are no other members in the BIX Identities System. Therefore, to make it reliable, the identity of the authority that initiates the instance of the public identities ledger is distributed by being hard-coded or pre-configured in the software application that the members of the system use to manage their identities. In that way, head identity is available to all participants in the system by being the first identity included in the public identities ledger.

If the BIX Identities Ledger is permissioned, then the next entities to create their identities and insert them into the ledger are BIX Security Policy Providers. This type of entity is usually a business entity that validates the correctness of identities of other users and binding of their identities to real-world persons. They perform that validation based on the application context or other business arrangements. These providers may also be application services providers. The content and validity of their identities are controlled by the BIX Security Policy Authority, so their identities are validated by that authority. After validation, they are linked to the identity of the BIX Security Policy Authority and inserted into an instance of the BIX Identities Ledger. They are shown in FIG. 3. When one or more BIX Security Policy Providers are registered, other entities may join the system and establish their identities. This version of the ledger is shown in FIG. 4. Because the ledger is without any third parties, personal identities are established by the persons themselves and the identities of IT system components are established by authorized system administrators. If the ledger is unpermissioned, BIX Security Policy Providers are not registered. In such ledgers, the members of the system create their identities without these identities being validated by providers. Such identities are linked only to the head identity in the ledger, i.e. the identity of the BIX Security Policy Authority. This version of the ledger is shown in FIG. 5.

From this short description of the initiation procedure of the BIX Identities Ledger, it is clear that the ledger reflects the procedure of validation of identities and therefore has the following structure: (a) the head of an instance is the identity of the BIX Security Policy Authority; (b) if the ledger is permissioned, the next entries in the ledger are the identities of the BIX Security Policy Providers linked to the initial identity of the ledger; and (c) the next entries are the identities of the individual members of the BIX system, which are linked to the identities of their corresponding BIX Security Policy Providers. The identities of BIX Security Policy Providers, linked to the identity of the BIX Security Policy Authority, are shown in FIG. 3. The identities of BIX members, linked to the identities of BIX Security Policy Providers, are shown in FIG. 4. Therefore, the structure of the ledger is not a single linear linked list, but a star-shaped structure, comprising multiple, parallel branches of the ledger. Each branch contains identity objects belonging to one of the members of the BIX system. All branches originate from the same head identity, reflecting the policy that is enforced when creating and validating identities in the specific instance of the ledger.

Each entity follows the following phases and performs the following protocols when creating, managing, and using identities:

The Creation of Identities:

In this step, an entity populates the values of selected attributes in the BIX Identity object. Because no third parties are involved in this process, it is obvious that this operation is performed by the person himself/herself, i.e. the owner of the identity. For entities that represent components of an IT system this step is performed by system administrators. In this step the identity creator does not populate the Header segment, only the SearchAttributes, PublicAttributes, and InitialValidator segments. Three attributes of the SearchAttributes segment are self-encrypted, i.e., their values (as data) are encrypted by the same values used as the cryptographic keys. If the values of the attributes of the SearchAttributes segment are left clear, the identity would be vulnerable to illegal or accidental modifications, to theft and impersonation, and to tracing and profiling. Furthermore, such identity would not provide user privacy or anonymity. To prevent illegal or accidental modifications, unauthorized sharing, tracking, and profiling, i.e. to provide privacy and anonymity, the PublicAttributes segment of the newly created identity must also be cryptographically protected. This segment is either self-enveloped (in unpermissioned ledgers) or enveloped for the BIX Security Policy Provider (in permissioned ledgers). The InitialValidator segment is populated with attributes designating the identity owner, so this version of the BIX Identity is self-validated and self-signed. As a result of this step, the cryptographically encapsulated (signed and enveloped), self-validated, self-signed form of the BIX Identity object is created and submitted to the BIX Synchronization System.

The Validation of Identities (Pre-Issuance):

The values of the identity attributes, created by the identity owner, must be validated so that the binding of the attribute values to the real-world entity (person or IT system component) is guaranteed and can be verified by all other members of the system. Because there are no third parties in the system, validation must be performed by its members. This validation is based either on the application context (registrations by application services providers), business context (employment or other business arrangements), or communication context (previous exchange of e-mails or messages over the Internet).

As a result of that validation, if the ledger is permissioned, the BIX Synchronization System populates the Header segment of the identity and sends it to the designated BIX Security Policy Provider. The InitialValidator segment in the identity of the new entity is populated by the Security Policy Provider that performed the initial validation. After validation, the identity is signed by the Provider. The assuranceLevel attribute of the identity is also populated. Such validated identity is returned to its owner who stores it locally in its digital device and also inserts it into the BIX Identities Ledger. If the BIX Identities Ledger is unpermissioned, this step is not performed and the BIX Synchronization System, after completion of the Header segment, returns the identity immediately back to its owner. This means that in this type of ledger, the newly created identity is not initially validated after its creation. In both versions, the identity is also stored locally by the software that the owner of the identity uses. In the case of permissioned ledgers, the identity is stored locally after being returned from the initial validator. If the ledger is unpermissioned, the identity is stored locally after its return by the BIX Synchronization System. In both cases, the identity owner also stores the identity in the BIX Identities Ledger.

The validation of identities and creation of personal identities chains, as branches of the public identities ledger, reflect user relationships with validators of their identities. The identities in the ledger are followed by identities that they validated. The system provides the possibility to create multiple personal identity chains linked to different BIX Security Policy Providers. Depending on the context, such identities may contain different sets of identification attributes, suitable for the application context for which the identity is created.

The Exchange of Identities:

After their creation, identities are cryptographically encapsulated (signed and self-enveloped) objects, held by their owners and also available in the BIX Identities Ledger. In the context of applications and transactions, identities are exchanged between transaction partners. This is performed as an action, i.e., by consent of their owners. In this process, identities are transformed from self-enveloped objects to signed and enveloped objects where the transaction partner is the recipient of the enveloped identity. This cryptographic transformation effectively prevents the unauthorized sharing of identities. Namely, if a transaction partner forwards the identity to some other member in the system, he/she would also need to forward his/her private cryptographic key, what means that all of his/her transactions and assets would be open to the party receiving the forwarded identity.

The Verification of Identities (Post-Issuance):

In the context of running applications and performing transactions, identities are exchanged between transaction partners. In this step, partners also validate each other's identities based on their communication context. As a result, a new object of the BIX Identities System is created for each identity, called the BIX Identity Validator. The BIX Identity Validator is a cryptographically signed object for which the signer is the validator of the identity. The BIX Identity Validator is added to the branch of the BIX Identities Ledger that belongs to that specific user, and the new object is linked to the identity object that it validated. In this way, the user's personal identity chain is extended with the new BIX Identity Validator object. This means that each branch of the BIX Identities Ledger that represents a users' personal identities chain starts with the head identity, followed by the identity of the BIX Security. Policy Provider (in permissioned ledgers) linked to the head identity, followed by the user's BIX Identity linked to the identity of the Provider, followed by none, one, or several BIX Identity Validators linked to the identity of the user. When the user updates his/her identity, a new BIX Identity object is created and appended to the last BTX Identity. This makes the original identity and all of its identity validators obsolete, and the user's personal identities chain is extended at the "tail" of that chain.

Validation, confirmation, and verification of the binding of identities to real-world persons are critical for the reliability and trustfulness of identities. In an IDMS with centralized repositories managed by trusted third parties, that validation is performed, and then guaranteed, by such third parties. Because the BIX Identities System does not have third parties, the members of the system, as community, must agree and adopt standard and recognizable procedures for that validation. These procedures determine so called assurance level of identities and are the part of BIX Security Policy. Based on those procedures, identities in the BIX Identities System may have five assurance levels, from the lowest (no assurance) to the highest (guaranteed assurance).

Assurance Level 1: At this level the binding is not validated by BIX Security Policy Provider. Those identities are used in unpermissioned ledgers.

Assurance Level 2: At this level the binding is validated using either the e-mail address or the mobile number of the identity owner. The protocol is a challenge/response, where the BIX Security Policy Provider sends (using the e-mail address or mobile number) a random code to the identity owner and receives the same code in reply.

Assurance Level 3: At this level the binding is validated using either e-mail addresses available from social websites or mobile numbers from the registries of telecom services providers.

Assurance Level 4: At this level the binding is validated using existing registration databases of various application services providers, such as banks, corporate registries, tax registrations, etc.

Assurance Level 5: At this level the binding is validated using face-to-face procedure and validation of official identification documents.

DESCRIPTION OF THE DRAWINGS

FIG. 1 shows the complete structure of the BIX Identity object in the ASN.1 encoded syntax FIG. 2 shows the initial version of an instance of the BIX Identities Ledger with only one object—the Identity of the BIX Security Policy Authority FIG. 3 shows the version of an instance of the permissioned BIX Identities Ledger with several identities belonging to the BIX Security Policy Providers and forward-linked by the BIX Security Policy Authority identity FIG. 4 shows the version of an instance of a permissioned BIX Identities Ledger with several identities belonging to the BIX system members forward-linked by the identities of the BIX Security Policy Providers FIG. 5 shows the version of an instance of an unpermissioned BIX Identities Ledger with several identities belonging to the BIX system members forward-linked by the identities of the BIX Security Policy Authority FIG. 6 shows the complete structure of the BIX Identity Validator object in the ASN.1 encoded syntax FIG. 7 shows an example of the PublicAttributes segment with attributes in clear form FIG. 8 shows an example of the PublicAttributes segment with attributes enveloped with the public key of the recipient FIG. 9 shows an example of the BIX Identities Ledger with BIX Validators objects FIG. 10 shows an example of the personal identities chain FIG. 11 shows an example of the community identities chain FIG. 12 shows an example of the personal identities chain with updated BIX Identity objects

DETAILED DESCRIPTION OF THE INVENTION

The Architecture and Components of the BIX Identities System

The BIX Identities System is based on the concept of peer-to-peer identity management protocols and the use of a global, distributed, append-only public identities ledger, without third parties. This means that the only participants in the system are BIX members. They create their own identities, they validate the binding between identities and real-world entities, and they verify each other's identities when performing transactions. The chaining of identities reflects their validation relationships. That is, an identity is forward-linked from (a) (in permissioned ledgers) the identities of the BIX Security Policy Providers that initially validated the identity, (b) from identity validators created by other BIX members who have validated the identity, and (c) from owner's own identity after its update.

BIX Identities System protocols are performed as peer-to-peer transactions between members of the BIX system. The purpose of these protocols is to create, validate, exchange, and verify BIX identities. Individual protocols are peer-to-peer identity protocols, which include generating identities; (in permissioned ledgers) sending them to BIX Security Policy Providers for validation of the binding between identities and real-world entities; distributing them to transaction partners; and validating the correctness of attributes and binding by those partners. Each person executes these protocols using the BIX Identities Agent, which is a PC, server, smart card, smart chip, or smart phone application.

If the communication between BIX system entities (in fact between their BIX Identities Agents) is indirect, then the BIX Synchronization System must be used in addition to BIX Identities Agents. One of its functions is to support secure (end-to-end encrypted) instant messages used to distribute identities objects and in that way update distributed instances of the global identities ledger, maintaining consensus for all participants of the global synchronized state of the ledger. BIX Identities Agents must be preconfigured with the URLs of several of the BIX Synchronization System servers so they can communicate with the components of the BIX Synchronization System to send and receive identity protocol messages. If the communication between the BIX Identities Agents is direct (peer-to-peer), then the transaction parties must first establish their communication channel. This may be achieved using different communication protocols, such as 3G/4G and similar radio protocols, the GPRS mobile Internet protocol, the HTTP/HTTPS mobile Web protocol, Bluetooth, NFC, or any other proximity communication protocol.

The BIX Identities System uses a public ledger to store and distribute identities. The ledger is star-shaped list of linked objects. An instance of the ledger always starts with the head object—the identity of the business entity that manages the ledger, i.e., that creates, controls, and enforces the security policy for identity management. If the ledger is permissioned, the identities of multiple BIX Security Policy Providers are the next entries in their individual branches of the ledger, forward-linked by the BIX Security Policy Authority identities. If the ledger is not permissioned, there are no Provider identities in the ledger. In that version the next type of object in the ledger is the identities of individual BIX system members. If the ledger is permissioned, these identities are forward-linked by the identities of the BIX Security Policy Providers. They branch out from the identities of the Providers and create personal identities chains. When an user's identity is verified by some other member of the BIX system, the BIX Identity Validator object is appended to the identity of the member that is validated, forward-linked by the newly created BIX Identity Validator. One identity may have multiple BIX Identity Validators, thus creating a star shape of the personal identities chain. When an identity is updated, it is linked by the previous instance of the same identity, thus extending the personal identities chain.

The BIX Identities Ledger is controlled and maintained by the BIX Ledger Agents, which are software modules that maintain the BIX Identities Ledger. They have a graphical interface for administrators, business logic, a communication module, database server interfaces, and cryptographic engines. They interact with the BIX Identities Agents used by users and assist them when using the BIX Identities Ledger. BIX Ledger Agents are distributed and thus represent nodes in the global distributed identities ledger. Each Agent maintains a full copy of the ledger, synchronized with other Agents by the messages sent to/received from the BIX Synchronization System.

If the members of the BIX system do not use technologies that can process and store identities on their local workstations, mobile phones, or other IT devices, they can use the assistance of BIX Ledger Agents. In such cases, the Agents (a) store users' identities and also (b) assist users to distribute them to their transaction partners, upon instructions from identity owners.

BIX Identities System Objects

The BIX Identities System uses two cryptographically encapsulated and signed objects: the BIX Identity, which contains public identification attributes and the BIX Identity Validator, which contains the attributes created as a result of the identity validation process performed by other members of the BIX system.

A BIX Identity object is shown in FIG. 1. It has five segments: Header 101, SearchAttributes 102, PublicAttributes 103, InitialValidator 104, and InitialValidatorSignature 105. The attributes in the Header segment 101 are: identificationNumber, which contains the personal identification number of the owner of the identity; version of the identity (currently equals one (1)); creationDateTime is the date/time when the identity was created by its owner; and assuranceLevel, which has values 1-5, as explained in the Summary of the Invention section.

The SearchAttributes segment 102 has three attributes, each of which is self-encrypted. This means that each is encrypted using its own value as the encryption key. The purpose of these encrypted attributes is to provide user privacy and anonymity, but still enable to search for or quickly verify the identity of the specific user, knowing his/her first name/last name, e-mail address or mobile number. The values of these attributes are known to friends and authorized members of the BIX community. So, knowing clear values of these three attributes enables quick search and their retrieval by authorized transaction parties. But, casual observers, man-in-the-middle or ISP providers cannot learn about identities of users by fetching them from the ledger or by capturing them during exchange before performing a transaction.

The PublicAttributes segment 103 is a collection of public identifying attributes, but only those that can be shared with authorized and verified transaction partners. The examples of such attributes are first name, last name, country, state, city, address, date of birth, etc. The creator/owner of the identity may choose his/her own set of attributes.

The InitialValidator segment 104 contains the attributes that designate the entity that validated the initial value of the identity. In permissioned ledgers, these validators are BIX Security Policy Providers, which are usually organizational, commercial, or public entities with which the user has some form of relationship. Examples of such relationships may be being employed by a company, having an account in a bank, or registering to pay tax. The validatorIDNumber is the identificationNumber of the verifying entity; signatureAlgorithm is the identifier of the asymmetric cryptographic algorithm that was used to sign the identity; validatorPublicKey is the public key that corresponds to the private key used to sign the identity; and the signature is contained in the InitialValidatorSignature, which is the last attribute of the identity object. If the ledger is unpermissioned, the InitialValidator segment represents the owner of the identity, so (a) the validatorIDNumber attribute is equal to the identificationNumber attribute from the Header segment and (b) the identity is self-signed.

FIG. 6 shows the BIX Identity Validator object that is created as a result of the validation procedure by one of the members of the BIX system. The object contains two segments: Header 601 designates the owner of the identity that is validated and the values of its attributes are the same as in the Header segment 601 of the original identity. The attributes in the BlockchainValidator segment 602 designate the member of the BIX system that has validated the identity. The attribute validatorIDNumber has the value of the identificationNumber attribute from the identity of the validator.

After validation, the BIX member signs the complete BIX Identity Validator object and populates the value of the BlockchainValidatorSignature attribute 603.

BIX Identities Management Protocols

The Enrollment Protocol:

The purpose of this protocol is to enroll a new person or an IT entity in the BIX system and to create its identity. In this protocol, persons and security administrators use their local copy of the BIX Identities Agent if they have the capability to execute the software locally. If not, they use the remote version located in the BIX Ledger Agent. Upon activation of the BIX Identities Agent, the application displays the panel to specify local authentication (login) personal identification number (PIN)/password and then the registration panel. The login PIN/password is not stored in the system and is used is the seed in a special authentication protocol, which is described in another invention.

After filling in the registration form, the PublicAttributes segment containing all specified public attributes is created. An example of such segment is shown in FIG. 7. The PIN 701 shown in FIG. 7 is not created/populated, as it must be unique in the BIX system. In this protocol, the Header segment 101 is not populated. Three attributes of the SearchAttributes 102 segment are self-encrypted. If the ledger is permissioned, the attributes of the PublicAttributes 103 segment are enveloped using the public key of the Security Policy Provider, which validates the identity, and the InitialValidator 104 segment is populated with values designating the selected Provider. If an unpermissioned ledger is used, then the attributes of the PublicAttributes 103 segment are self-enveloped using the public key of the identity owner and the attributes of the InitialValidator 104 segment are populated with values designating the owner of the identity. Enveloping or self-enveloping of PublicAttributes segment is shown in FIG. 8. After that, the identity owner sends the identity to the BIX Synchronization System to complete the protocol.

The Initial Validation Protocol:

The purposes of this protocol are to (a) validate the binding of the public attributes with the real-world person to whom the attributes belong and (b) determine an identification number for the new BIX member. In the case of a person, that number is called Personal Identification Number (PIN) and it must be unique in the BIX system. Step (a) is performed only in permissioned ledgers. The BIX Synchronization System, other than maintaining the global synchronized state of the ledger by the distribution of messages, is also in charge of the synchronization of global parameters in the entire BIX system, determining numbers for the members of the BIX system and the global time. For communication and synchronization purposes, it keeps the identification numbers of all members in the BIX system in its registry and based on that registry, assigns a new and unique PIN to the new identity. In the same step, the system populates the version and creationDateTime attributes.

If the BIX Identities System uses an unpermissioned ledger, the BIX Synchronization System also populates the value of the assuranceLevel parameter by setting it to one (1). Such an identity object, with its Header completed by the BIX Synchronization System, is returned as an instant message to the owner of the identity. The owner completes the identity by self-signing it, storing it locally in its BIX Identities Agent local database, and sending it to the BIX Ledger Agent for insertion into the BIX Identities Ledger. If the ledger is permissioned, the identity must be validated by the Security Policy Provider with which the new user is associated, indicated in validatorIDNumber in the InitialValidator segment. In that case, the identity is forwarded by the BIX Synchronization System to the Security Policy Provider.

After receiving the identity, the Security Policy Provider first opens the envelope of the PublicAttributes and uses one of the procedures to determine the identity's assurance level, described in the Summary of the Invention section. As a result, the assuranceLevel attribute is populated and to complete the InitialValidator segment. The PublicAttributes segment with attribute values in clear form is signed and the signature is stored in the clearAttributesSignature attribute. After that, the PublicAttributes segment is enveloped for the identity owner. This completed (validated) identity is returned to its owner via the BIX Synchronization System. As before, the owner stores the completed identity in the local database and also sends it to the BIX Ledger Agent for insertion into the BIX Identities Ledger.

The Exchange Protocol:

The purpose of this protocol is to exchange the identities of two partners who intend to perform a transaction. The primary purpose is to recognize legitimate partners but also to obtain the credentials needed to follow-up on security protocols before the transaction is performed. The identities are exchanged in the application context using the BIX Synchronization System.

It is clear that identities, in the form described in the sections Enrollment Protocol or Initial Validation Protocol, cannot be recognized and used by the transaction partner, because they are enveloped for the identity owner, as described in the Enrollment Protocol or Initial Identity Validation Protocol sections. Therefore, before sending, they are first transformed by the identity owner into the standard cryptographically encapsulated object signedAndEnvelopedData. The contentInfo attribute of that object contains two objects: (1) the full, original BIX Identity and (2) the PublicAttributes segment enveloped for the partner. The signer of that object is the owner of the identity and the recipient is the transaction partner. The object is sent to the transaction partner via the BIX Synchronization System.

The Community Validation Protocol:

The purpose of this protocol is to validate the identity by the transaction partner. Validation is performed by those partners that can recognize, and therefore validate, the attributes in the PublicAttributes segment and confirm their binding to a real-world entity. The validation procedure may be performed when performing a transaction, when a partner agrees to complete a transaction, or as a separate protocol. In permissioned ledgers this procedure is not critical, as identities are always initially validated by BIX Security Policy Providers. But, in unpermissioned ledgers, this validation is very important, as it is the only procedure that can validate identities. Therefore, it is clear that in unpermissioned ledgers, this validation procedure represents truly community-based validation.

After receiving the signedAndEnvelopedData object, the partner first verifies sender's signature and then opens the outer envelope, i.e., the envelope of the entire object. Then, he/she verifies the signature of the BIX Identity object using validatorPublicKey from the InitialValidator segment. Correct verification means that the identity is correct and, in particular, that the attribute clearAttributesSignature can be used. The partner then opens the inner envelope containing the PublicAttributes object that was included in the signedAndEnvelopedData object, creates hash of the clear value of the PublicAttributes segment, and compares it with the hash obtained from the clearAttributesSignature. Correct verification confirms to the partner that the clear values of the PublicAttributes object are correct.

As a result, the BIX Identity Validator object is created, shown in FIG. 6. The attribute identificationNumber designates the identity that was validated, so it is copied from that identity. This procedure is mutual, so that each transaction party receives the validation object for its identity. Since identificationNumber attribute in the Header 601 segment of the BIX Identity Validator object points to the owner of the identity being validated, this means that BIX Identity Validator object is linked to the identity that it validates. That means that the BIX Identity object is backward-linked by the Validator object. This is shown in FIG. 9 where two BIX members, Member 2 902 and Member 3 903 validated another member, Member 1 901.

Because the segment blockchainValidator 602 contains the validatorIDNumber that points to the BIX Identity of the validator, this means that the BIX Identities System, in addition to physical personal identities chains, also provides logical identities chains by linking BIX members that have mutually validated each other. Validators in FIG. 9 are shown as personal identities chains in FIG. 10. The Validators of both members, Member 2 1002 and Member 3 1003, are pointing to the identity of the Member 1 1001 that they validated. Personal identities chain of the Member 1 contains validators of the Members 2 1001 and 3 1002 and indirectly identities of the Members 2 and 3.

Extending this approach from a single member to a group leads to the concept of a community identities ledger, shown in FIG. 11. In case of multiple members such logical identities ledgers constitute trusted communities in the larger, global, BIX community. FIG. 11 shows that the Member 2 1101 has validated the identity of Member 2 so it is in its personal identities chain 1102. Member 3 has validated the identity of Member 1 (validator not shown), so Member 3 is in the Member 1 personal identity chain 1103. But, since Member 2 has validated Member 3 1102 and Member 3 has validated Member 1 1103, validation of Member 1 by Member 2 1104 is indirect.

The Request/Response Protocol:

The purpose of this protocol is to request the identities of potential transaction partners in advance or when partners are not online. This protocol is supported by the BIX Identities Ledger. The components that manage the ledger are BIX Ledger Agents, as previously described. In this case, in addition to storing BIX Identities for users who do not have local processing and storage capabilities, BIX Ledger Agents also store the identities of BIX members in the BIX Identities Ledger. In that way, transaction partners may issue requests for identities by specifying the first name/last name, e-mail address, or mobile number of the requested identity. These request parameters are then self-encrypted and used to search the ledger. At the same time, although the entries in the ledger are public, user privacy and anonymity is not violated because none of the identifying attributes in the identities is stored in clear form.

Because the distribution of identities is by user consent, the owner of the identity is notified about the request. If he/she is willing to approve it and send the identity to the requesting partner, the owner creates the signedAndEnvelopedData form for the identity object, as described in the Identity Exchange Protocol section, and submits it to the BIX Synchronization System for delivery to the requesting partner. If the owner of the identity has a local BIX Identities Agent, this procedure is performed at the local station. Otherwise, it is performed by the BIX Ledger Agent.

The Update Protocol:

The purpose of this protocol is to update the attributes of the BIX Identity. Attribute values that need to be updated are specified by the owner of the identity. The attributes identificationNumber, version, and assuranceLevel from the Header segment are not updated; rather, they are inherited from the current identity. Individual attributes in the searchAttributes segment may be updated, while attributes in the PublicAttributes segment may be extended and/or updated. To minimize validation overload on BIX Security Policy Providers, the new identity is issued by its owner. This means that after creation and validation of the initial instance of the identity, all other instances of updated identities are self-issued, so the validator of the updated instance of the identity is its owner himself/herself. Therefore, the attributes of the InitialValidator segment are populated as follows: validatorIDNumber is set to the identificationNumber of the identity; signatureAlgorithm is set to the objectIdentifier of the public key algorithm used by the identity owner; validatorPublicKey is the public key of the owner of the identity, extracted from his/her BIX certificate; and InitialValidatorSignature is the self-signed signature, i.e., is created using the private key of the identity owner. The new attribute values of the PublicAttributes are self-enveloped by the owner of the identity.

When the user updates his/her identity, a new BIX Identity object is created and appended to the last BIX Identity. This is shown in FIG. 12 with two updates 1202 and 1203. This makes the original identity 1201 and all of its identity validators obsolete, and the user's personal identities chain is extended at the "tail" of that chain.

In this protocol, if any of the public attributes included in the DistinguishedName segment of the identity owner's BIX certificate are modified, then the identity owner must also request the re-issue of the BIX certificate with the new DistinguishedName.

I claim:

1. A system for managing identities of entities in a computer network, comprising:

a plurality of computing devices in the computer network, each computing device being associated with at least one entity; and an electronic append-only public identities ledger maintained simultaneously at more than one of the plurality of computing devices, the electronic append-only public identities ledger comprising a plurality of cryptographically-encapsulated identity objects that each uniquely identify a respective entity within the computer network, wherein each of the plurality of cryptographically-encapsulated identity objects further comprises:

one or more identification attributes that uniquely identify a first entity associated with the respective cryptographically-encapsulated identity object, the one or more identification attributes being self-enveloped via a public cryptographic key of the first entity; and one or more validation attributes created by a second entity associated with a separate cryptographically-encapsulated identity object, wherein the one or more validation attributes are used to validate that the one or more identification attributes accurately identify the first entity, wherein, upon respective validation, each of the plurality of cryptographically-encapsulated identity objects are structured in a linked list and maintained simultaneously at at least a first computing device associated with the first entity and a second computing device associated with the second entity.

2. The system of claim 1, wherein the plurality of cryptographically-encapsulated identity objects are cryptographically encapsulated by hashing.

3. The system of claim 1, wherein the plurality of cryptographically-encapsulated identity objects are cryptographically encapsulated by symmetric key encryption.

4. The system of claim 1, wherein the structuring in a linked list occurs after the plurality of cryptographically encapsulated identity objects self-validate the structuring and classify the identification attributes as pre-issuance validators.

5. The system of claim 1, wherein a subset of the plurality of cryptographically encapsulated identity objects perform post-issuance validation of the structuring using a peer-to-peer validation protocol.

6. The system of claim 1, wherein the linked list comprises a block chain.

7. The system of claim 1, wherein the linked list comprises a star-shaped linked list.

8. The system of claim 7, wherein the star-shaped linked list comprises one or more parallel branches.

9. The system of claim 1, wherein the entities in the computer network comprise a human user, an organization, software application and/or a uniquely-identifiable computing device.

10. The system of claim 1, wherein each of the plurality of cryptographically-encapsulated identity objects further comprises a header, search attributes, public attributes, an initial validator, and a validator signature.

11. The system of claim 10, wherein the header comprises an identification number identifying the respective entity, a version number indicating a current version of the respective object, a time stamp indicating a time of creation of the respective object, and an assurance level indicating an appropriate level of validation of the respective entity.

12. The system of claim 10, wherein the search attributes comprise encrypted versions of a name, email address, and mobile phone number associated with the respective entity.

13. The system of claim 10, wherein the public attributes comprise a name, country, state, city, address and date of birth associated with the respective entity.

14. The system of claim 10, wherein the initial validator comprises data associated with identification attributes of the second entity responsible for validation of the first entity.

15. The system of claim 10, wherein each of the search attributes, public attributes, and the initial validator are populated by the respective entity.

16. The system of claim 1, wherein the plurality of cryptographically-encapsulated identity objects are exchangeable between more than one of the plurality of computing devices in the computer network.

17. The system of claim 16, wherein the plurality of cryptographically-encapsulated identity objects are exchangeable by means of a peer-to-peer cryptographic protocol.

18. The system of claim 16, wherein in order to be exchanged, the one or more identification attributes of the plurality of cryptographically-encapsulated objects are transformed from self-enveloped to signed-and-enveloped objects.

19. The system of claim 1, wherein respective validation of the identification attributes occurs according to registrations of service providers, business arrangements, and/or exchange of communications over the computer network.

20. The system of claim 1, wherein respective validation of the identification attributes is assigned an assurance level, wherein the assurance level indicates an appropriate level of validation.

21. The system of claim 1, wherein the electronic append-only public identities ledger comprises an authority entity, wherein the authority entity initiates an instance of the first entity.

22. The system of claim 1, wherein the second entity comprises a policy provider entity, wherein the policy provider entity defines how the plurality of cryptographically-encapsulated identity objects of the electronic append-only public identities ledger are protected, distributed, validated, or managed.

23. A method for managing identities of entities associated with an electronic append-only public identities ledger maintained at a plurality of electronic computing devices in a computer network, comprising:

receiving at one or more of the electronic computing devices in the computer network a cryptographically-encapsulated identity object that uniquely identifies a particular entity within the computer network, wherein the cryptographically-encapsulated identity objects further comprises:

one or more identification attributes that uniquely identify the respective entity associated with the cryptographically-encapsulated identity object, the one or more identification attributes being self-enveloped via a public cryptographic key of the respective entity; and one or more validation attributes created by a second entity associated with a separate cryptographically-encapsulated identity object;

upon receipt of the cryptographically-encapsulated identity object at the one or more electronic computing devices in the computer network, validating the one or more identification attributes associated with the respective entity by means of the one or more validation attributes created by the second entity and associated with a separate cryptographically-encapsulated identity object; and, upon validation of the one or more identification attributes associated with the respective entity, structuring the plurality of cryptographically-encapsulated identity objects in a linked list that is maintained simultaneously at at least a first computing device associated with the respective entity and a second computing device associated with the second entity.

24. A system for managing identities of entities in a computer network, comprising:

a plurality of computing devices in the computer network, each computing device being associated with at least one entity; and an electronic append-only public identities ledger maintained simultaneously at more than one of the plurality of computing devices, the electronic append-only public identities ledger comprising a plurality of cryptographically-encapsulated identity objects that each uniquely identify a respective entity within the computer network, wherein each of the plurality of cryptographically-encapsulated identity objects further comprises:

one or more identification attributes that uniquely identify a first entity associated with the respective cryptographically-encapsulated identity object, each of the one or more identification attributes being self-enveloped via a public cryptographic key of the first entity, each of the one or more identification attributes further comprising;

a header comprising a personal identification number of the first entity, a version number associated with a current version of the first object, a date and time the first object was created, and an assurance level associated with an appropriate level of validation of the first entity;

one or more search attributes comprising self-encrypted versions of a name, email address, and mobile phone number associated with the first entity;

one or more public attributes comprising the name, country, state, city, address, and date of birth associated with the first entity;

an initial validator comprising information associated with one or more identification attributes of a second entity, the second entity being at least partially responsible for validating the first entity; and an initial validator signature comprising an electronic signature of the second entity after respective validation, one or more validation attributes created by the second entity, wherein the one or more validation attributes are used to validate that the one or more identification attributes accurately identify the first entity, each of the one or more validation attributes further comprising:

a header, a blockchain validator, and a blockchain validator signature, each comprising information associated with identification attributes of the second entity, wherein, upon respective validation, each of the plurality of cryptographically-encapsulated identity objects are structured in a star-shaped linked list and maintained simultaneously at at least a first computing device associated with the first entity and a second computing device associated with the second entity.

* * * * *